US008570587B2

(12) United States Patent
Kerxhalli et al.

(10) Patent No.: US 8,570,587 B2
(45) Date of Patent: Oct. 29, 2013

(54) METHOD AND APPARATUS FOR ACCURATE MEASUREMENT OF IMAGING SURFACE SPEED IN A PRINTING APPARATUS

(75) Inventors: David Mark Kerxhalli, Rochester, NY (US); Jonathan Byron Hunter, Marion, NY (US)

(73) Assignee: Xerox Corporation, Norwalk, CT (US)

( * ) Notice: Subject to any disclaimer, the term of this patent is extended or adjusted under 35 U.S.C. 154(b) by 768 days.

(21) Appl. No.: 12/764,548

(22) Filed: Apr. 21, 2010

(65) Prior Publication Data

US 2011/0261372 A1 Oct. 27, 2011

(51) Int. Cl.
*G06K 15/00* (2006.01)

(52) U.S. Cl.
USPC ........... 358/1.18; 358/1.12; 358/1.5; 399/279

(58) Field of Classification Search
None
See application file for complete search history.

(56) References Cited

U.S. PATENT DOCUMENTS

| | | | | |
|---|---|---|---|---|
| 5,287,162 | A | 2/1994 | De Jong et al. | |
| 5,748,221 | A | 5/1998 | Castelli et al. | |
| 5,970,295 | A * | 10/1999 | Samizo | 399/309 |
| 6,038,423 | A | 3/2000 | Tagawa et al. | |
| 6,292,208 | B1 | 9/2001 | Lofhus et al. | |
| 6,909,316 | B2 | 6/2005 | Owens et al. | |
| 7,039,348 | B2 | 5/2006 | Kerxhalli et al. | |
| 7,257,362 | B2 | 8/2007 | Facci et al. | |
| 7,645,013 | B2 | 1/2010 | Murakami et al. | |
| 2003/0202810 | A1 | 10/2003 | Udaka et al. | |
| 2005/0253054 | A1 | 11/2005 | Guarino et al. | |
| 2006/0262711 | A1 | 11/2006 | Shintani et al. | |
| 2010/0020364 | A1 | 1/2010 | Kerxhalli et al. | |

* cited by examiner

*Primary Examiner* — Twyler Haskins
*Assistant Examiner* — Lennin Rodriguezgonzalez
(74) *Attorney, Agent, or Firm* — Ronald E. Prass, Jr.; Prass LLP

(57) ABSTRACT

According to aspects of the embodiments, there is provided methods and apparatus for sensing the movement of a moving surface by utilizing a plurality of reference patterns positioned on the surface, using the precision of the ROS Start of Scan Clock, and the uses of encoder and MOB sensors. The plurality of reference patterns are placed a known number of scanlines apart. The MOB sensor and encoder measure the distance between reference patterns. Increase accuracy is achieved by sampling the encoder signal with the ROS Master Clock and calculating a fractional encoder count at the first and last encoder counts of the measurement. The use of fractional encoder counts provides a speed measurement with greater tolerance for variations in encoder dimensions and belt thickness.

20 Claims, 5 Drawing Sheets

METHOD AND APPARATUS FOR ACCURATE MEASUREMENT OF IMAGING SURFACE SPEED IN A PRINTING APPARATUS

BACKGROUND

The field of the present invention relates generally to sensing the velocity of a moving surface and, more particular, to a motion sensor to detect the passage of registration marks formed around the circumference of a photoreceptor belt in a xerographic printing apparatus to measure the speed of the belt.

In printing systems that utilize an elongate image receiving surface, such as a paper web or a belt, the receiving surface reaches a first marking station where a marking material of a first color is applied to the surface, e.g., by firing ink jets, exposing an image on a photoconductive material, or applying toner particles to a selectively imaged photoconductive member. The receiving surface then moves on to a second marking station, where an image or marking material of a second color is applied, and so forth, depending on the number of colors. The timing of the actuation of the second marking station is controlled as a function of the speed of the image receiving surface so that the images applied by the two marking stations are registered one on top of the other to form a composite, multicolor image. A high degree of process direction alignment can be achieved by knowing the speed or position of the image receiving surface. Currently the speed is measured with an encoder at a certain location and then the images are timed accordingly. For example, an encoder is associated with a drive nip roller. The rotational speed of the roller is used to calculate the speed of the image receiving surface passing through the nip. The time for actuating the first, second, and subsequent marking stations is then calculated, based on their respective distances from the drive nip roller and the determined speed of the image receiving surface.

In the case of an electrophotographic printer, an encoder may be placed on the photoreceptor belt to measure the exact speed of the belt at each instant of time. Additional techniques for determining photoreceptor speed include calculation based on belt module encoder frequency, encoder roll diameter, and photoreceptor belt thickness. The photoreceptor speed can then be used to time the firing of the laser raster output scanner (ROS) or light emitting diode (LED) bar so that an even spacing of lines is imaged on the photoreceptor. The surface speed calculation is also used for sensor timing, image sync generation, calculations for image on paper setup, and speed matching with the media path. While adequate for current printing process speeds, the current techniques would not be adequate for designs that need an increase in process speed. Because current speed calculations are based on nominal values, they tend to produce photoreceptor speed calculations with variability or tolerances that are not within an acceptable range.

For the reasons stated above, and for other reasons stated below which will become apparent to those skilled in the art upon reading and understanding the present specification, there is a need in the art for a more accurate measurement of photoreceptor speed.

SUMMARY

The disclosure relates to method and apparatus for sensing the movement of a moving surface by utilizing a plurality of reference patterns positioned on the surface, using the precision of the ROS Start of Scan Clock, an encoder and an MOB sensor. The plurality of reference patterns are placed a known number of scanlines apart. The MOB sensor and encoder measure the distance between reference patterns. Increased accuracy is achieved by sampling the encoder signal with the ROS Master Clock and calculating a fractional encoder count at the first and last encoder counts of the measurement. The use of fractional encoder counts provides a speed measurement with greater tolerance for variations in encoder dimensions and belt thickness.

DETAILED DESCRIPTION

Figure 1:
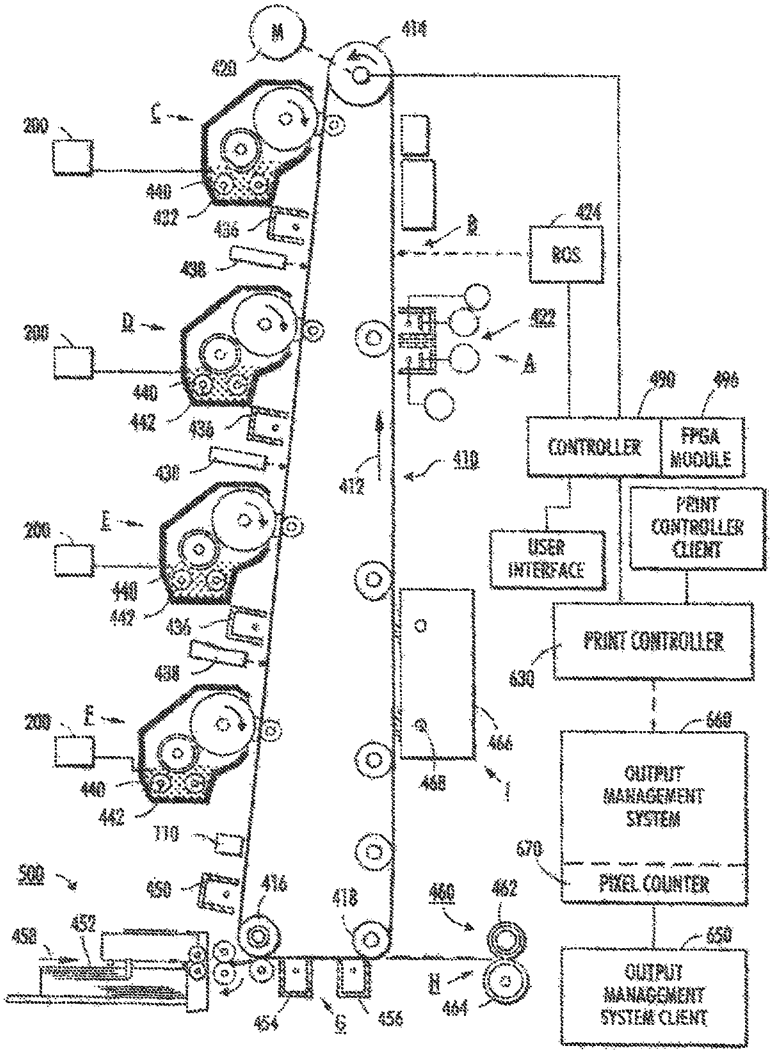
FIG. 1 is a schematic elevational view of a typical electrophotographic printing machine in accordance to an embodiment.

While the present invention will be described in connection with preferred embodiments thereof, it will be understood that it is not intended to limit the invention to that embodiment. On the contrary, it is intended to cover all alternatives, modifications and equivalents as may be included within the spirit and scope of the invention as defined by the appended claims.

Aspects of the disclosed embodiments relate to method and apparatus to measure the speed of a moving surface having a primary movement direction. The apparatus comprises a plurality of reference patterns formed of slant lines provided on the moving surface, wherein the plurality of reference patterns are placed a predetermined distance apart on the moving surface; a sensor to detect the plurality of reference patterns being moved on the moving surface, wherein the sensor produces a timestamp when it detects a reference pattern; an encoder coupled to a drive system of the moving surface, the encoder generating encoder pulses; an ROS master clock to generate discrete clock pulses; and a logic circuit coupled to the sensor, the encoder, and the master clock to determine the speed of the moving surface by: counting the number of encoder pulses generated by the encoder between a first timestamp and a second timestamp; determining a leading fractional encoder count relative to the first time stamp; determining a trailing fractional encoder count relative to the second time stamp; and determining an elapsed interval of time between the first timestamp and the second timestamp.

In yet another aspect, the disclosed embodiment the apparatus uses a logic circuit such as field programmable gate array (FPGA), application specific integrated circuit (ASIC), or complex programmable logic device (CPLD) to determine the speed of the moving surface.

In still another embodiment, the plurality of reference patterns are arranged in a chevron pattern of regularly spaced stripes.

In a further disclosed embodiment, the apparatus determines a leading fractional encoder by counting the discrete clock pulses that occur between the first time stamp and a next encoder pulse.

In another disclosed embodiment, the apparatus determines a trailing fractional encoder count by counting the discrete clock pulses that occur between the second time stamp and a next encoder pulse.

In another aspect, the disclosed embodiment, the apparatus further comprises a controller to control a printing system based on the determined speed of the moving surface.

In another aspect, the disclosed embodiment is a method to determine the speed of a moving surface having a primary movement direction. The method comprises receiving from a sensor a plurality of timestamps indicative of a plurality of reference patterns being moved on the moving surface; receiving encoder pulses from an encoder associated with the moving surface; receiving discrete clock pulses from an ROS master clock; and processing with a logic unit the received timestamps, encoder pulses, and discrete clock pulses to determine the speed of the moving surface by: counting the encoder pulses generated between a first timestamp and a second timestamp; determining a leading fractional encoder count relative to the first time stamp; determining a trailing fractional encoder count relative to the second time stamp; determining an elapsed interval of time between the first timestamp and the second timestamp.

In another aspect, the disclosed embodiment is a document processing system that comprises a photoreceptor that continuously moves along a closed path; at least one raster output scanner (ROS) located along the closed path of the photoreceptor, the ROS operable to generate a latent image on a portion of the photoreceptor based on a clock input; a clock providing a clock output signal to the ROS; a sensor to detect a plurality of reference patterns being moved on the photoreceptor, wherein the sensor produces a timestamp when it detects a reference pattern; an encoder coupled to the photoreceptor, wherein movement of the photoreceptor causes the encoder to generate encoder pulses; a controller coupled with the ROS to selectively operate the document processing system according to a photoreceptor speed; and logic circuit to determine photoreceptor speed from the encoder pulses, the timestamp, and the clock output signal by: counting the number of encoder pulses generated by the encoder between a first timestamp and a second timestamp; determining a leading fractional encoder count relative to the first time stamp; determining a trailing fractional encoder count relative to the second time stamp; and determining an elapsed interval of time between the first timestamp and the second timestamp.

Embodiments as disclosed herein may also include computer-readable media for carrying or having computer-executable instructions or data structures stored thereon for operating such devices as controllers, sensors, and eletromechanical devices. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

The term "printing system" as used herein refers to a digital copier or printer, image printing machine, digital production press, image reproduction machine, bookmaking machine, facsimile machine, multi-function machine, or the like and can include several marking engines, feed mechanism, scanning assembly as well as other print media processing units, such as paper feeders, finishers, and the like.

The term "Print job" or "document" can include a plurality of digital pages or electronic pages to be rendered as one or more copies on a set of associated sheets of print media, each page, when rendered constituting the front or backside of a sheet. The pages of a print job may arrive from a common source and, when rendered, be assembled at a common output destination. The term "print media" generally refers to a usually flexible, sometimes curled, physical sheet of paper, plastic, or other suitable physical print media substrate for images, whether precut or web fed.

FIG. 1, an Output Management System 660 may supply printing jobs to the Print Controller 630. Printing jobs may be submitted from the Output Management System Client 650 to the Output Management System 660. A pixel counter 670 is incorporated into the Output Management System 660 to count the number of pixels to be imaged with toner on each sheet or page of the job, for each color. The pixel count information is stored in the Output Management System memory. The Output Management System 660 submits job control information, including the pixel count data, and the printing job to the Print Controller 630. Job control information, including the pixel count data and digital image data are communicated from the Print Controller 630 to Controller 490.

The printing system preferably uses a charge retentive surface in the form of an Active Matrix (AMAT) photoreceptor belt 410 supported for movement in the direction indicated by arrow 412, for advancing sequentially through the various xerographic process stations. The belt is entrained about a drive roller 414, tension roller 416 and fixed roller 418 and the drive roller 414 is operatively connected to a drive motor 420 for effecting movement of the belt through the xerographic stations. A portion of belt 410 passes through charging station A where a corona generating device, indicated generally by the reference numeral 422, charges the photoconductive surface of photoreceptor belt 410 to a relatively high, substantially uniform, preferably negative potential.

Next, the charged portion of photoconductive surface is advanced through an imaging/exposure station B. At imaging/exposure station B, a controller, indicated generally by reference numeral 490, receives the image signals from Print Controller 630 representing the desired output image and processes these signals to convert them to signals transmitted to a laser based output scanning device, which causes the charge retentive surface to be discharged in accordance with the output from the scanning device. Preferably, the scanning device is a laser Raster Output Scanner (ROS) 424. Alternatively, the ROS 424 could be replaced by other xerographic exposure devices such as LED arrays.

The photoreceptor belt 410, which is initially charged to a voltage $V_0$, undergoes dark decay to a level equal to about −500 volts. When exposed at the exposure station B, it is discharged to a level equal to about −50 volts. Thus after exposure, the photoreceptor belt 410 contains a monopolar voltage profile of high and low voltages, the former corresponding to charged areas and the latter corresponding to discharged or developed areas.

At a first development station C, developer structure, indicated generally by the reference numeral 432 utilizing a hybrid development system, the developer roller, better known as the donor roller, is powered by two developer fields (potentials across an air gap). The first field is the AC field which is used for toner cloud generation. The second field is the DC developer field which is used to control the amount of developed toner mass on the photoreceptor belt 410. The toner cloud causes charged toner particles to be attracted to the electrostatic latent image. Appropriate developer biasing is accomplished via a power supply. This type of system is a non-contact type in which only toner particles (black, for example) are attracted to the latent image and there is no mechanical contact between the photoreceptor belt 410 and a toner delivery device to disturb a previously developed, but unfixed, image. A toner concentration sensor 200 senses the toner concentration in the developer structure 432.

The developed but unfixed image is then transported past a second charging device 436 where the photoreceptor belt 410 and previously developed toner image areas are recharged to a predetermined level.

A second exposure/imaging is performed by device 438 which comprises a laser based output structure is utilized for selectively discharging the photoreceptor belt 410 on toned areas and/or bare areas, pursuant to the image to be developed with the second color toner. At this point, the photoreceptor belt 410 contains toned and untoned areas at relatively high voltage levels, and toned and untoned areas at relatively low voltage levels. These low voltage areas represent image areas which are developed using discharged area development (DAD). To this end, a negatively charged, developer material 440 comprising color toner is employed. The toner, which by way of example may be yellow, is contained in a developer housing structure 442 disposed at a second developer station D and is presented to the latent images on the photoreceptor belt 410 by way of a second developer system. A power supply (not shown) serves to electrically bias the developer structure to a level effective to develop the discharged image areas with negatively charged yellow toner particles. Further, a toner concentration sensor 200 senses the toner concentration in the developer housing structure 442.

The above procedure is repeated for a third image for a third suitable color toner such as magenta (station E) and for a fourth image and suitable color toner such as cyan (station F). The exposure control scheme described below may be utilized for these subsequent imaging steps. In this manner a full color composite toner image is developed on the photoreceptor belt 410. In addition, a mass sensor 110 measures developed mass per unit area. Although only one mass sensor 110 is shown in FIG. 1, there may be more than one mass sensor 110.

To the extent to which some toner charge is totally neutralized, or the polarity reversed, thereby causing the composite image developed on the photoreceptor belt 410 to consist of both positive and negative toner, a negative pre-transfer dicorotron member 450 is provided to condition the toner for effective transfer to a substrate using positive corona discharge.

Subsequent to image development a sheet of support material 452 is moved into contact with the toner images at transfer station G. The sheet of support material 452 is advanced to transfer station G by a sheet feeding apparatus 500, described in detail below. The sheet of support material 452 is then brought into contact with photoconductive surface of photoreceptor belt 410 in a timed sequence so that the toner powder image developed thereon contacts the advancing sheet of support material 452 at transfer station G.

Transfer station G includes a transfer dicorotron 454 which sprays positive ions onto the backside of sheet 452. This attracts the negatively charged toner powder images from the photoreceptor belt 410 to sheet 452. A detack dicorotron 456 is provided for facilitating stripping of the sheets from the photoreceptor belt 410.

After transfer, the sheet of support material 452 continues to move, in the direction of arrow 458, onto a conveyor (not shown) which advances the sheet to fusing station H. Fusing station H includes a fuser assembly, indicated generally by the reference numeral 460, which permanently affixes the transferred powder image to sheet 452. Preferably, fuser assembly 460 comprises a heated fuser roller 462 and a backup or pressure roller 464. Sheet 452 passes between fuser roller 462 and backup roller 464 with the toner powder image contacting fuser roller 462. In this manner, the toner powder images are permanently affixed to sheet 452. After fusing, a chute, not shown, guides the advancing sheet 452 to a catch tray, stacker, finisher or other output device (not shown), for subsequent removal from the printing machine by the operator.

After the sheet of support material 452 is separated from photoconductive surface of photoreceptor belt 410, the residual toner particles carried by the non-image areas on the photoconductive surface are removed therefrom. These particles are removed at cleaning station I using a cleaning brush or plural brush structure contained in a housing 466. The cleaning brushes 468 are engaged after the composite toner image is transferred to a sheet.

Controller 490 regulates the various printer functions. The controller 490 is preferably a programmable controller, which controls printer functions hereinbefore described. The controller 490 may provide a comparison count of the copy sheets, the number of documents being recirculated, the number of copy sheets selected by the operator, time delays, jam corrections, and the like. The control of all of the exemplary systems heretofore described may be accomplished by conventional control switch inputs from the printing machine consoles selected by an operator. Conventional sheet path sensors or switches may be utilized to keep track of the position of the document and the copy sheets.

FPGA Module 496 determines the speed of photoreceptor belt 410 from data provided primarily from an encoder, ROS master clock (RMC), and an MOB sensor. The Field Programmable Gate Array (FPGA) provides controller 490 with the calculated speed of the photoreceptor belt. The controller uses the calculated speed to generate a control parameter to influence the printing process.

Figure 2:
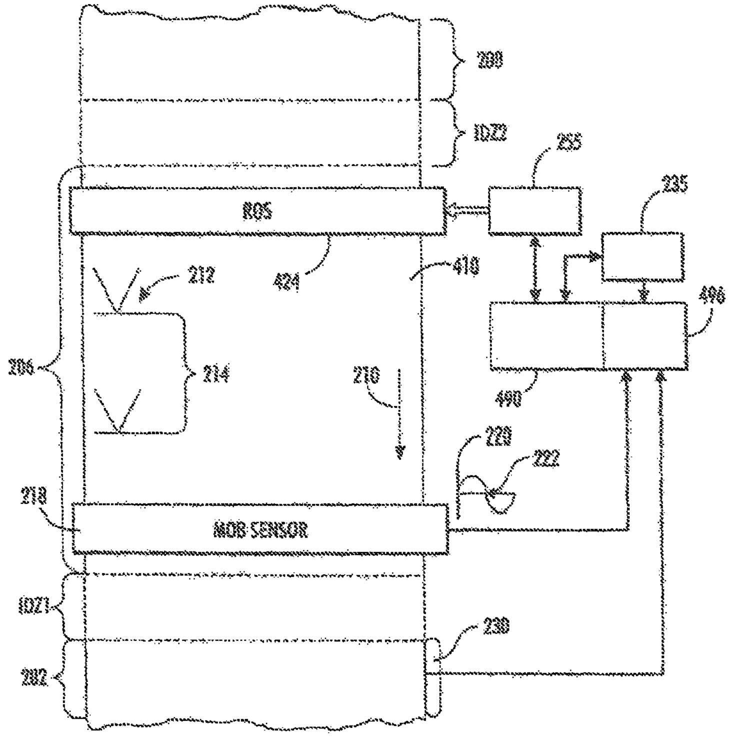
FIG. 2 is a partial top plan view illustrating a portion of the exemplary photoreceptor belt in the system of FIG. 1 with a plurality reference patterns, and image panel zones separated by inter panel zones in accordance to an embodiment.

FIG. 2 is a partial top plan view illustrating a portion of the exemplary photoreceptor belt in the system of FIG. 1 with a plurality reference patterns, and image panel zones separated by inter panel zones in accordance to an embodiment. In particular, FIG. 2 shows an example of marks or reference patterns formed of slant lines provided on the moving surface used to measure the photoreceptor belt speed as it moves 210 towards MOB sensor 218. A pair of Chevron marks 212 are written within a single panel 206 multiple times (16 chevrons per belt) around photoreceptor belt 410. The marks is spaced apart by distance 214 as closely as possible representing the circumference of the drive roll and encoder roll 230. For example, with an encoder roll 230 of circumference around 308 mm (DrvRollCircumferenceNom) and start of scan distance (SOStoSOSDistanceNom) of 0.084666 mm a distance (ChevronDistScanlines) between the marks is around 7276 scanlines. The calculation of the distance between the chevrons is in units of scanlines because of the close relationship between the ROS master clock (RMC) 235 and the speed of the photoreceptor belt 410. The SOStoSOSDistanceNom is useful because the exact time between Start of Scans is known due to the extremely high accuracy of the ROS Master Clock 235 and is a parameter that is readily available in a printing system. The Start of Scan to Start of Scan distance of 0.084666 mm is a nominal distance, which depends upon both the Start of Scan frequency and the photoreceptor speed. For calculating the distance 214 between chevrons 212 the nominal photoreceptor speed is close enough. It is critical to space the chevrons 212 approximately one Encoder Roll circumference apart, which will nearly eliminate the error induced by roll eccentricity at the Encoder Roll frequency. Encoder Roll once around error is the dominant belt motion error in the system. The belt motion error is removed from the system by using a chevron distance 214 that is at least one integer multiple of the Encoder Roll circumference apart. The number of speed measurements and the distance between chevrons is a function of the photoreceptor belt length and the image panel size. For example, an imaging system having a 2808 mm photoreceptor belt length with 308 mm image panel size can support a distance between chevrons of approximately 308 mm. In this situation the system shall be running in eight (8) pitch mode (8 Panels) since one could fit eight image panels into a 2808 mm photoreceptor belt. This maximizes the number of speed measurements around the circumference of the belt for averaging—in this case it would be 8 measurements.

In eight pitch mode, an FPGA generates eight (8) photoreceptor speed measurements around the belt circumference. The exemplary photoreceptor belt 410 includes a plurality of image panel zones 202, 206, 208 in which ROS 424 generates latent images, where two exemplary panel zones 202 and 208 are illustrated in partial views. Any number of panels may be defined along the circuitous length of the photoreceptor belt 410, and the number may change dynamically based on the size of the print media being fed to the transfer mechanism, where the illustrated photoreceptor belt 410 includes about eight (8) such zones to accommodate two chevron marks per panel, where the distance between the marks is one encoder roll circumference. The panel zones are separated from one another by inter panel zones, where two exemplary inter panel zones IDZ1 and IDZ2 are shown. In operation, the controller provides ROS 424 with one or more control signals through driver 255, including a control parameter associated with each upcoming image panel zone to indicate whether a latent image to be generated on the upcoming panel zone is to be fixed to a first side or to a second side. Based on this control parameter, the ROS 424 selects the clock output signals from RMC 235 for use in generating a latent image on the upcoming panel zone.

The exemplary photoreceptor belt 410 includes a plurality of image panel zones 202, 206, 208 in which ROS 424 generates latent images, where two exemplary panel zones 202 and 208 are illustrated in partial views. Any number of panels may be defined along the circuitous length of the photoreceptor belt 410, and the number may change dynamically based on the size of the print media being fed to the transfer mechanism, where the illustrated photoreceptor belt 410 includes about eight (8) such zones to accommodate two chevron marks per panel, where the distance between the marks is one encoder roll circumference. The panel zones are separated from one another by inter panel zones, where two exemplary inter panel zones IDZ1 and IDZ2 are shown. In operation, the controller provides ROS 424 with one or more control signals through driver 255, including a control parameter associated with each upcoming image panel zone to indicate whether a latent image to be generated on the upcoming panel zone is to be fixed to a first side or to a second side. Based on this control parameter, the ROS 424 selects the clock output signals from RMC 235 for use in generating a latent image on the upcoming panel zone.

In determining photoreceptor speed an MOB sensor signal, a PR Encoder 230 signal, and a ROS Master Clock (RMC) 235 signal is processed by an FPGA (Field Programmable Gate Array) module, ASIC circuit and the like. In the iGen family of printers the FPGA already exists on the MIOP Board. The RMC 235 is a high speed clock which is also used to drive the ROS motor polygon assembly (MPA). The MOB sensor 218 read the chevrons 212. The MOB sensor 218 produces a timestamp 220 as the centroid 222 of the chevron mark passes and this timestamp is sent to the FPGA module. MOB sensors used on belts are shown in U.S. Pat. No. 6,292,208, which is incorporated by reference. The FPGA module can now count the number of roll encoder 230 counts between the marks. During a calibration cycle the FPGA measures and stores the RMC counts in 18432 PRMC, which represents 18 revolutions of the photoreceptor (PR) encoder at 1024 PR Encoder lines/rev. Additionally, the FPGA module can count the number of RMC 236 counts from the first mark or first timestamp to the next encoder count and from the last mark or second timestamp to the next encoder count. Note that the FPGA also divides the ROS Master Clock (RMC) signal down by 256 in order to get units of 256RMC. From this a leading fractional encoder count relative to the first time stamp and a trailing fractional encoder fractional encoder count can be calculated. Accuracy in determining photoreceptor belt speed is increased by using chevrons placed one encoder circumference apart and by using the fractional encoder counts and ROS master clock.

Figure 3:
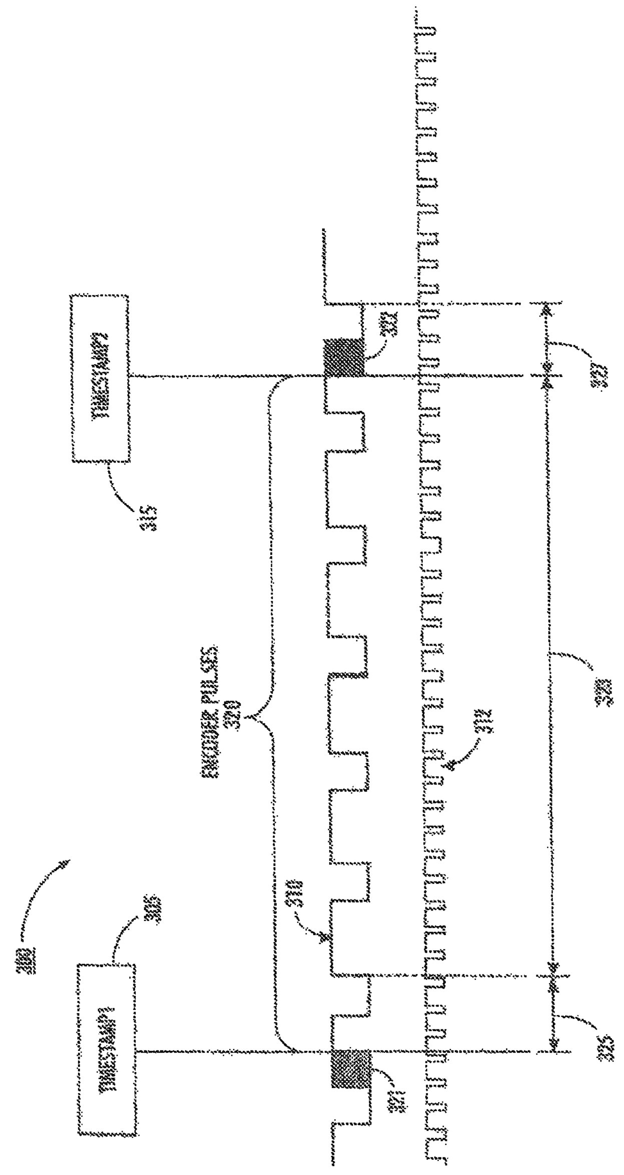
FIG. 3 is a timing diagram to be utilized in conjunction with FIG. 4 for determining the speed of a moving surface in accordance to an embodiment.
Figure 4:
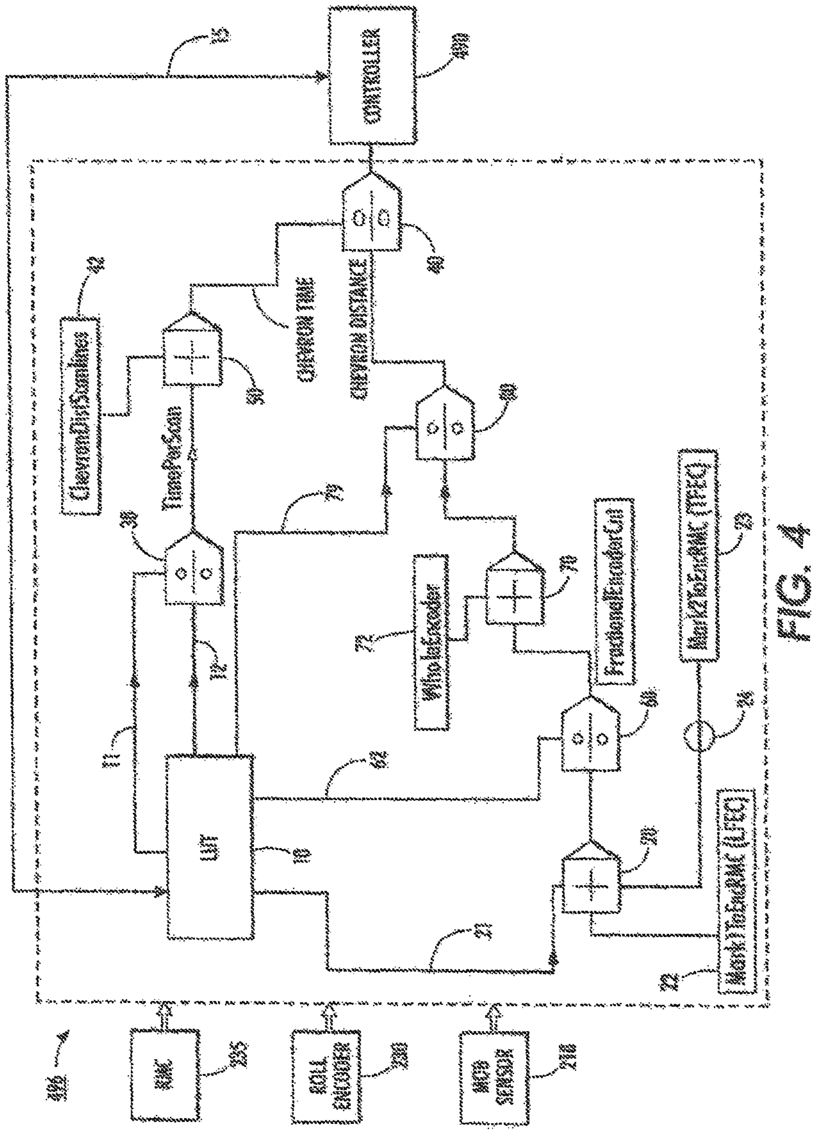
FIG. 4 is a block diagram of a Field Programmable Gate Array (FPGA) arranged to determine the speed of a moving surface in accordance to an embodiment.

FIG. 3 is a timing diagram 300 to be utilized in conjunction with FIG. 4 for determining the speed of a moving surface in accordance to an embodiment. The first timestamp 305 signals the beginning of the counting necessary to measure photoreceptor speed. As noted earlier the MOB sensor signal 220 is used as a trigger to start and stop the counting process that will determine the speed of the photoreceptor belt 410. At the zero crossing 222 of the MOB signal the FPGA starts the process. The encoder pulses 320 are counted until a second timestamp 315 is received by FPGA module 496. Each of the pulses 310 are indicative of photoreceptor belt displacement. Further, note that not all of the encoder pulses 320 occur within the time range defined by the first and second timestamps. Some of the pulses are only partially 321 and 322 within the defined range. To increase accuracy a leading fractional encoder count (LFEC) 325 and a trailing fractional encoder count (TFEC) 327 are added or subtracted from the whole encoder count 323 from the encoder pulses 320. The fractional encoder counts are defined in terms of the ROS master clock 312 signals.

FIG. 4 is a block diagram of a Field Programmable Gate Array (FPGA) 496 arranged to determine the speed of a moving surface in accordance to an embodiment. Internally the FPGA uses multipliers, dividers (30, 40, 60, and 80), adders (20, 50 and 70), and lookup table 10 to calculate the speed of the photoreceptor belt. The input values that the FPGA needs to produce a measurement of photoreceptor belt speed are from RMC 235, roll encoder 230, and MOB sensor 218. The calculated photoreceptor belt speed is then forwarded to controller 490 for further processing. As noted earlier with eight panels there are a total of eight speed measurements. Circuitry could be added to FPGA 496 to average these values. In the alternative, controller 490 could be programmed with a simple moving average routine to calculate average photoreceptor belt speed. The averaging whether performed at the FPGA or the controller removes any variations induced by the photoreceptor Belt circumference.

In terms of the plurality of reference patterns the velocity of the belt is expressed as:

$$PRBeltSurfaceVelocity = \frac{ChevronDistance}{ChevronImageTime}$$

In order to perform the above calculation a lookup table (LUT) 10 is populated with values needed internally by the FPGA to perform the calculations. These values can be populated by controller 490 through line 15 or the values could be calculated on the FPGA from the received RMC, roll encoder, and MOB sensor signals.

Multiplier 40 calculates ChevronImageTime by multiplying the distance between chevron marks 214 (ChevronDistScanlines 42) and the TimeperScan. Divider 30 determines TimePerScan from the number of RMC counts in a scan (RMC/Scan) 11 and the number of RMC counts in a second (RMC/second) 12, which are both taken from LUT 10. TimePerScan is in the range of 150-200 Microseconds (µsecs). ChevronImageTime is roughly two thirds (⅔) of a second because there are roughly 7276 scanlines between the chevrons (ChevronDistScanlines 42).

Chevron distance is determined from the following relationship:

$$ChevronDistance = \frac{(WholeEncoderCnt + FractionalEncoderCnt)}{\text{SP\_BeltEncoderResolution} * PRMCScalingFactor}$$

Where:

WholeEncoderCnt 72 is Number of whole encoder counts between the chevron marks (Timestamp1 305 and Timestamp2 315) detected by MOB Sensor 218. SPBeltEncoderResolution is the nominal roll encoder 230 resolution in MachineClocks/mm. PRMCScalingFactor is a Scaling factor calculated based on encoder measurement using the ROS Master clock (RMC 235) and the nominal value for RMC 235. The SP_BeltEncoderResolution and the PRMCScalingFactor is supplied by LUT 10 through line 79 as a composite value. By multiplying by this factor, any error due to the Belt Control board is removed.

The fractional encoder count is a sampling of the encoder signal so as to mitigate circumstances where the encoder pulses are only partially within the defined range. The fractional encoder count is calculated from the following mathematical relationship:

$$FractionalEncoderCnt = \frac{(LFEC + \text{NVM23524\_RmcBlockToPRmcRatio} * 256 - TFEC))}{\text{NVM23524\_RmcBlockToPRmcRatio}}$$

Where:

LFEC 22 is the Number of RMC Counts from the first mark 325 to the next Encoder Count.

TFEC 23 is the Number of RMC Counts from the second mark 327 to the next Encoder Count. Further, note that in the above equation this number is subtracted 24 from the average 62 of NVM23524_RmcBlockToPRmcRatio.

NVM23524_RmcBlockToPRmcRatio*256 is Total Number 21 of RMC in one encoder count. This is an average number 62 that is calculated in the printing system and stored in a non-volatile memory (NVM).

NVM23524_RmcBlockToPRmcRatio is the RMC count divided into 256*18432 PRMC slots.

Figure 5:
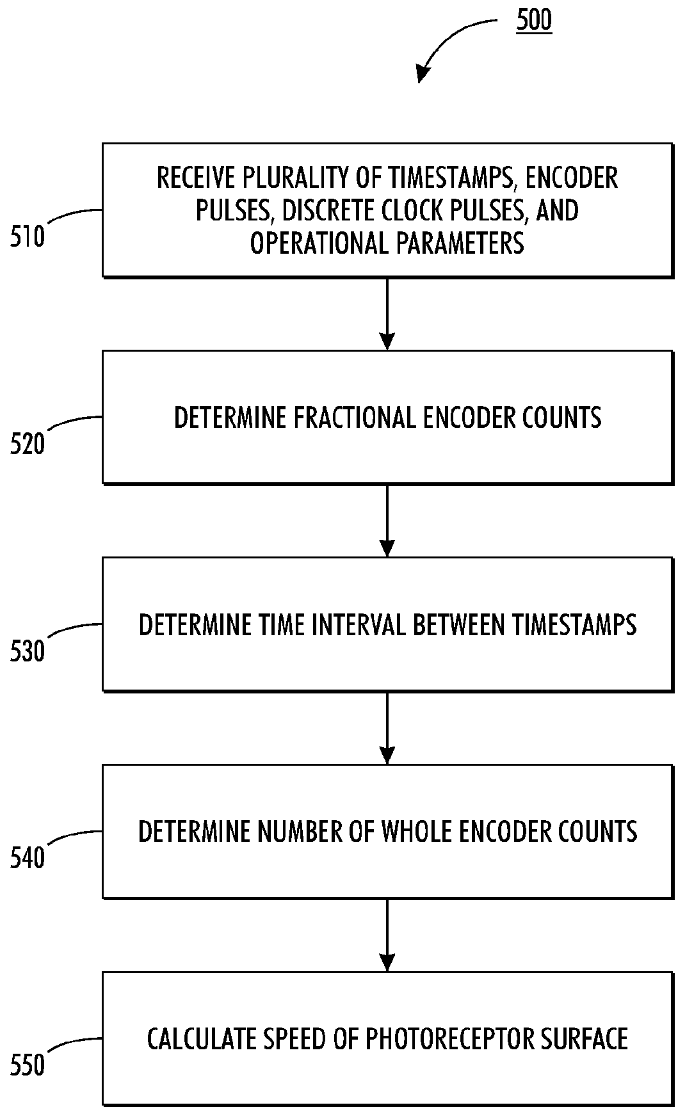
FIG. 5 is a flowchart of a process to determine the speed of a moving surface having a primary movement direction in accordance to an embodiment.

FIG. 5 is a flowchart of a process 500 to determine the speed of a moving surface having a primary movement direction in accordance to an embodiment. Process 500 begins with action 510 where the logic circuit receives MOB sensor signals that form the first and second timestamps, encoder pulses from roll encoder 230, the discrete clock pulses from ROS master clock (RMC) 235, and operational parameters such as NVM23524_RmcBlockToPRmcRatio and the like. Control is then passed to action 520 for further processing. In action 520 the fractional encoder count (FEC) is determined by first determining a leading fraction encoder count (LFEC) and a trailing fractional encoder count (TFEC). The FEC is a correction factor for encoder distance that provides a highly accurate measurement of actual distance between the marks. The leading and trailing count values are then added and subtracted from the total numbers of discrete clock pulses in one encoder count. Control is then passed to action 530 for further processing. In action 530 the time that it takes the belt to move from a first chevron to a second chevron is determined. ChevronImageTime is a function of the distance between chevrons and the time it takes the ROS to perform a single scan. ChevronImageTime, when chevron marks are spaced apart by a distance that represents the circumference of the drive roll and encoder roll 230, is in the range of 0.5 to 1 sec. Control is then passed to action 540 for further processing. In action 540, the number of whole encoder counts that occur within the first timestamp (start) and the second timestamp (stop) is determined. The logic circuit only counts encoder pulses that start and end within the time period defined by the first and second timestamps. It should be noted that the WholeEncoderCnt represents a first approximation of ChevronDistance and when this approximation is augmented with the fractional encoder count a fairly accurate determination of the distance is obtained. Control is then passed to action 550 for further processing. In action 550 the determined fractional encoder count, the whole encoder count, and the time between chevrons are combined to calculate the speed of a photoreceptor belt. Process 500 can be repeated for each panel on the photoreceptor belt thus increasing the number of speed measurements around the belt circumference.

Although the illustrated hardware embodiment, such as shown in FIGS. 1 and 2 herein, relate to a xerographic color printer in which ROS lasers expose directly to a moving photoreceptor surface, the description herein can apply to other printing systems as well. The description can apply to a color xerographic system wherein a separate photoreceptor for each primary color successively transfers color toner to a substantially non-photosensitive intermediate belt (in which case, the non-photosensitive intermediate belt would serve as the moving imaging surface). The description can also apply to an ink-jet system in which separate sets of ink-jet printheads deposit ink on an intermediate belt or drum, or directly onto a substantially continuous web (in which case, the intermediate belt or drum, or web, would serve as the moving imaging surface).

Although specific embodiments of the present technology have been described, it will be understood by those of skill in the art that there are other embodiments that are equivalent to the described embodiments. Accordingly, it is to be understood that the technology is not to be limited by the specific illustrated embodiments, but only by the scope of the appended claims.

What is claimed is:

1. An apparatus to measure the speed of a moving imaging surface having a primary movement direction, the apparatus comprising:

marking means for providing a plurality of reference patterns formed of slant lines provided on the moving surface, wherein the marking means includes means for creating and developing an electrostatic image on the imaging surface;

a sensor to detect the plurality of reference patterns being moved on the moving surface, wherein the sensor produces a timestamp when it detects a reference pattern;

an encoder comprising at least one encoder roll associated with the moving imaging surface, the encoder generating encoder pulses;

an ROS master clock to generate discrete clock pulses; and a logic circuit coupled to the sensor, the encoder, and the master clock to determine the speed of the moving surface by:

counting the number of encoder pulses generated by the encoder between a first timestamp and a second timestamp;

determining a leading fractional encoder count relative to the first timestamp;

determining a trailing fractional encoder count relative to the second timestamp; and determining an elapsed interval of time between the first timestamp and the second timestamp;

wherein the reference patterns being spaced along the moving imaging surface by a predetermined distance substantially corresponding to a circumference of the encoder roll.

2. The apparatus according to claim 1, wherein the logic circuit is at least one of field programmable gate array (FPGA), application specific integrated circuit (ASIC), or complex programmable logic device (CPLD).

3. The apparatus according to claim 2, wherein the plurality of reference patterns are arranged in a chevron pattern of regularly spaced stripes.

4. The apparatus according to claim 3, wherein determining a leading fractional encoder is counting the discrete clock pulses that occur between the first time stamp and a next encoder pulse.

5. The apparatus according to claim 3, wherein determining a trailing fractional encoder count is counting the discrete clock pulses that occur between the second time stamp and a next encoder pulse.

6. The apparatus according to claim 3, the apparatus further comprising:

a controller to control a printing system based on the determined speed of the moving surface.

7. The apparatus according to claim 6, wherein the moving surface includes a plurality of image panel zones each image panel corresponding to a page image desired to be printed, with successive panel zones separated by inter panel zones, wherein the controller provides a control parameter indicating whether an image to be generated on an upcoming panel zone is to be fixed to a first side or a second side of a print sheet.

8. A method to determine the speed of a moving surface having a primary movement direction, the method comprising:

receiving from a sensor a plurality of timestamps indicative of a plurality of reference patterns being moved on the moving surface;

receiving encoder pulses from an encoder associated with the moving surface;

receiving discrete clock pulses from an ROS master clock; and processing with a logic unit the received timestamps, encoder pulses, and discrete clock pulses to determine the speed of the moving surface by:

counting the encoder pulses generated between a first timestamp and a second timestamp;

determining a leading fractional encoder count relative to the first time stamp;

determining a trailing fractional encoder count relative to the second time stamp;

determining an elapsed interval of time between the first timestamp and the second timestamp.

9. The method according to claim 8, wherein the logic unit is at least one of field programmable gate array (FPGA), application specific integrated circuit (ASIC), or complex programmable logic device (CPLD).

10. The method according to claim 9, wherein the plurality of reference patterns are arranged in a chevron pattern of regularly spaced stripes.

11. The method according to claim 10, wherein determining a leading fractional encoder is counting the discrete clock pulses that occur between the first time stamp and a next encoder pulse.

12. The method according to claim 10, wherein determining a trailing fractional encoder count is counting the discrete clock pulses that occur between the second time stamp and a next encoder pulse.

13. The method according to claim 10, the method further comprising:

controlling a printing system based on the determined speed of the moving surface.

14. The method according to claim 13 wherein the moving surface includes a plurality of image panel zones each image panel corresponding to a page image desired to be printed, with successive panel zones separated by inter panel zones, wherein the controller provides a control parameter indicating whether an image to be generated on an upcoming panel zone is to be fixed to a first side or a second side of a print sheet.

15. A document processing system, comprising:

a photoreceptor that continuously moves along a closed path;

at least one raster output scanner (ROS) located along the closed path of the photoreceptor, the ROS operable to generate a latent image on a portion of the photoreceptor based on a clock input;

a clock providing a clock output signal to the ROS;

a sensor to detect a plurality of reference patterns being moved on the photoreceptor, wherein the sensor produces a timestamp when it detects a reference pattern;

an encoder coupled to the photoreceptor, wherein movement of the photoreceptor causes the encoder to generate encoder pulses;

a controller coupled with the ROS to selectively operate the document processing system according to a photoreceptor speed; and logic circuit to determine photoreceptor speed from the encoder pulses, the timestamp, and the clock output signal by:

counting the number of encoder pulses generated by the encoder between a first timestamp and a second timestamp;

determining a leading fractional encoder count relative to the first time stamp;

determining a trailing fractional encoder count relative to the second time stamp; and determining an elapsed interval of time between the first timestamp and the second timestamp.

16. The document processing system according to claim 15, wherein the logic circuit is at least one of field programmable gate array (FPGA), application specific integrated circuit (ASIC), or complex programmable logic device (CPLD).

17. The document processing system according to claim 16, wherein the plurality of reference patterns are arranged in a chevron pattern of regularly spaced stripes.

18. The document processing system according to claim 17, wherein determining a leading fractional encoder is counting discrete clock pulses from the clock output signal that occur between the first time stamp and a next encoder pulse.

19. The document processing system according to claim 17, wherein determining a trailing fractional encoder count is counting the discrete clock pulses from the clock output signal that occur between the second time stamp and a next encoder pulse.

20. The document processing system according to claim 19, wherein the moving surface includes a plurality of image panel zones each image panel corresponding to a page image desired to be printed, with successive panel zones separated by inter panel zones, wherein the controller provides a control parameter indicating whether an image to be generated on an upcoming panel zone is to be fixed to a first side or a second side of a print sheet.

* * * * *